(No Model.) 9 Sheets—Sheet 1.
D. GESSNER.
CLOTH PRESSING MACHINE.
No. 565,071. Patented Aug. 4, 1896.
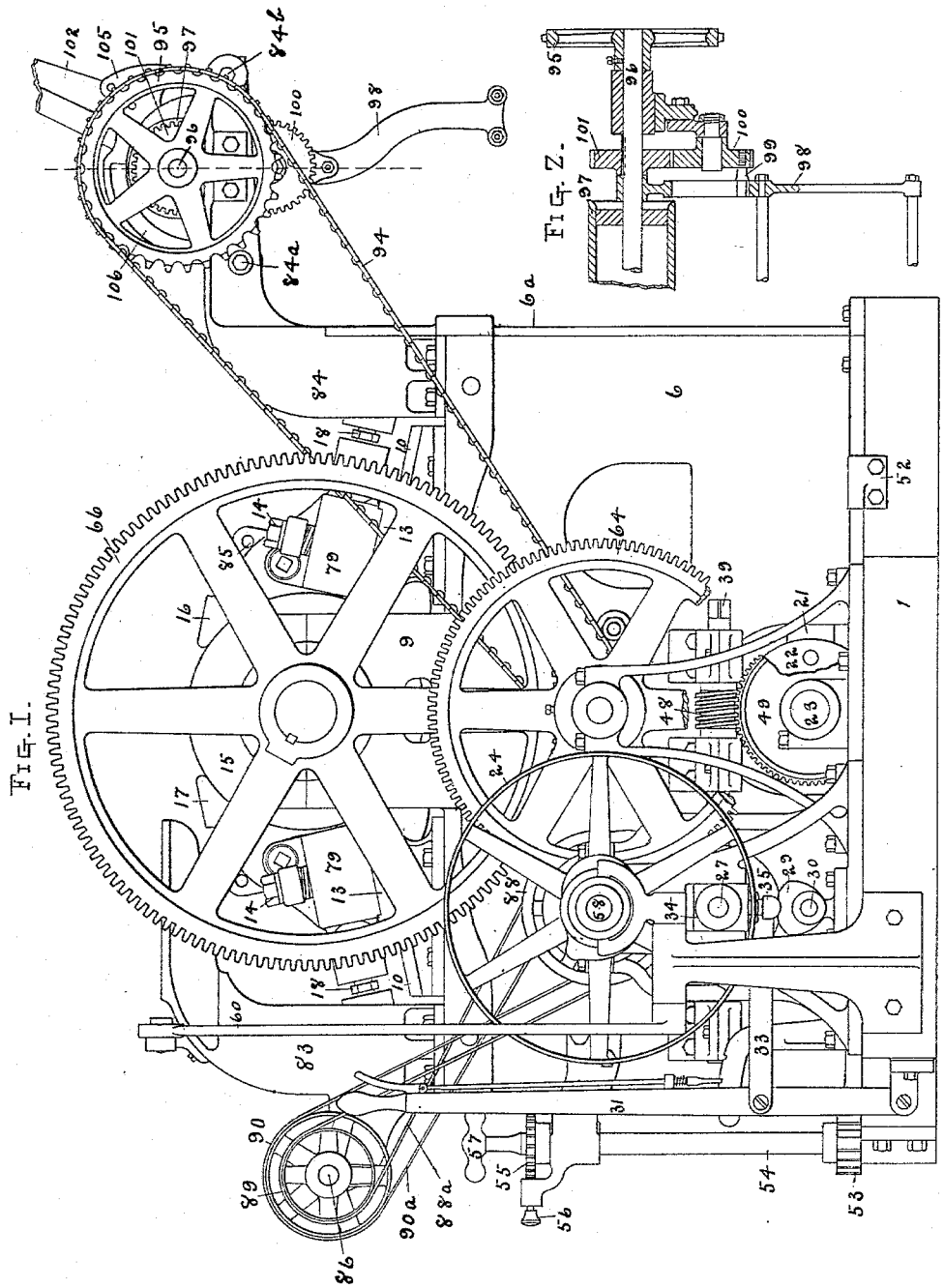
Witnesses:
Fred F. Kemper
D. H. Hayford
Inventor:
David Gessner
by Giffords, Law, Att'ys (No Model.)
9 Sheets—Sheet 2.
D. GESSNER.
CLOTH PRESSING MACHINE.
No. 565,071.　　　　　　　　　　Patented Aug. 4, 1896.
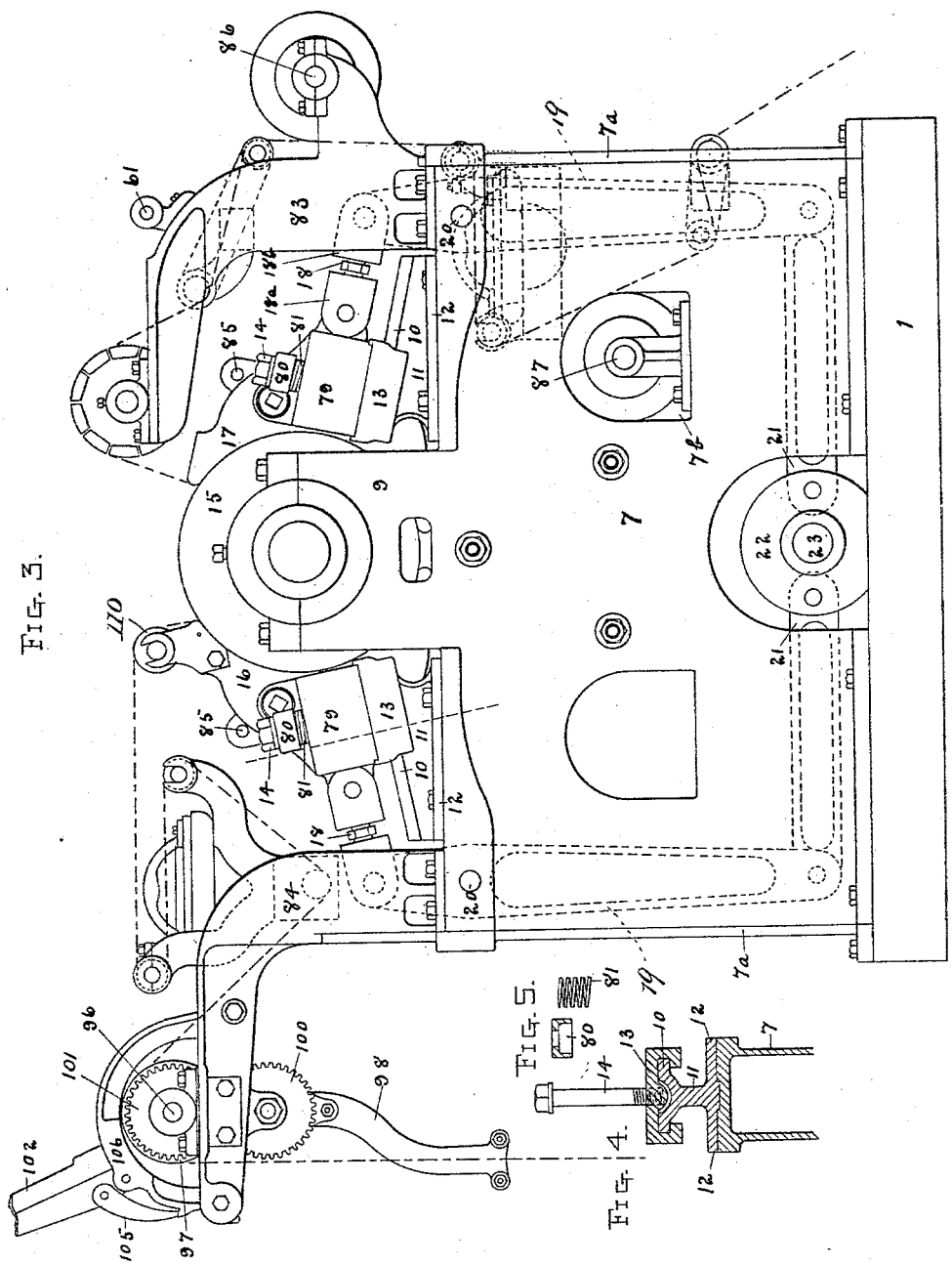
Witnesses:
Fred S. Kemper.
D. K. Hayward.
Inventor:
David Gessner
by Gifford & Saw. Att'ys (No Model.) 9 Sheets—Sheet 3.

D. GESSNER.
CLOTH PRESSING MACHINE.

No. 565,071. Patented Aug. 4, 1896.

Witnesses:
Fred Kemper
W. H. Hayward

Inventor;
David Gessner
by Giffords Law Attys.

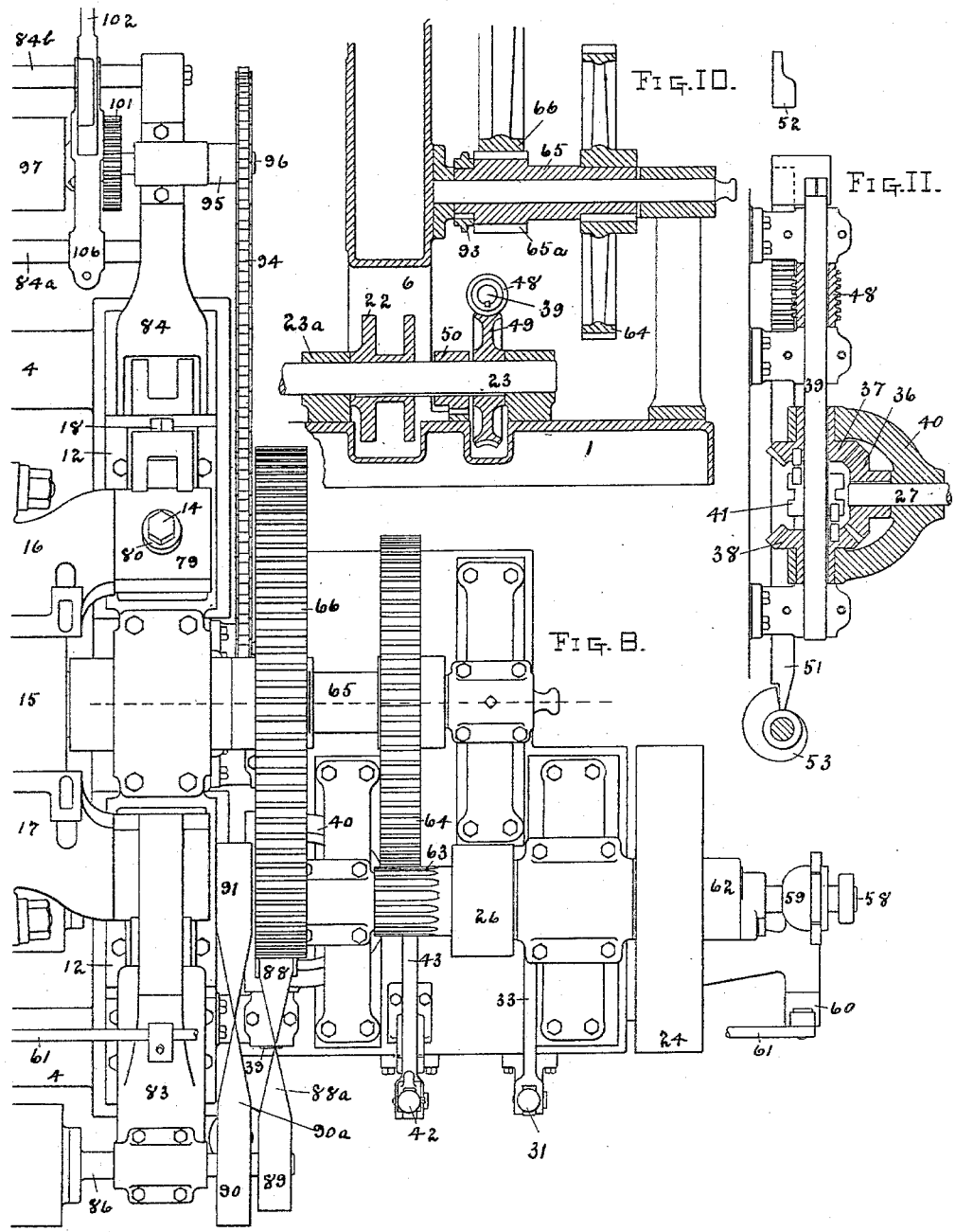

(No Model.) 9 Sheets—Sheet 5.
D. GESSNER.
CLOTH PRESSING MACHINE.
No. 565,071. Patented Aug. 4, 1896.
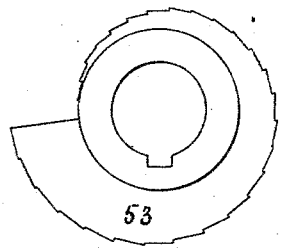
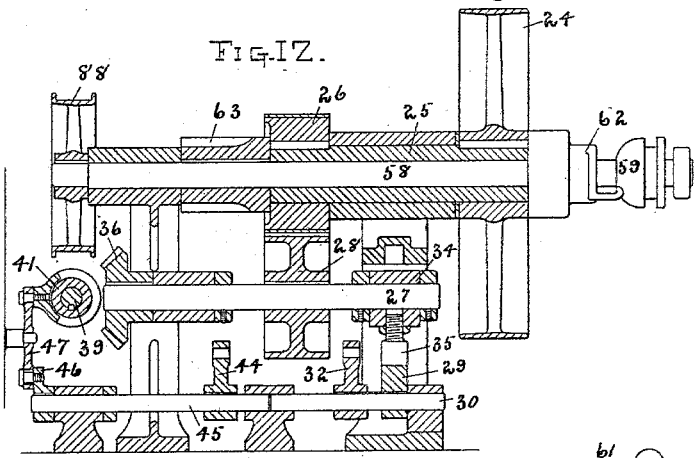
Witnesses:
Fred F. Kemper.
D. H. Hayford.
Inventor:
David Gessner
by Gifford & Saw. Att'ys (No Model.) 9 Sheets—Sheet 6.
D. GESSNER.
CLOTH PRESSING MACHINE.
No. 565,071. Patented Aug. 4, 1896.
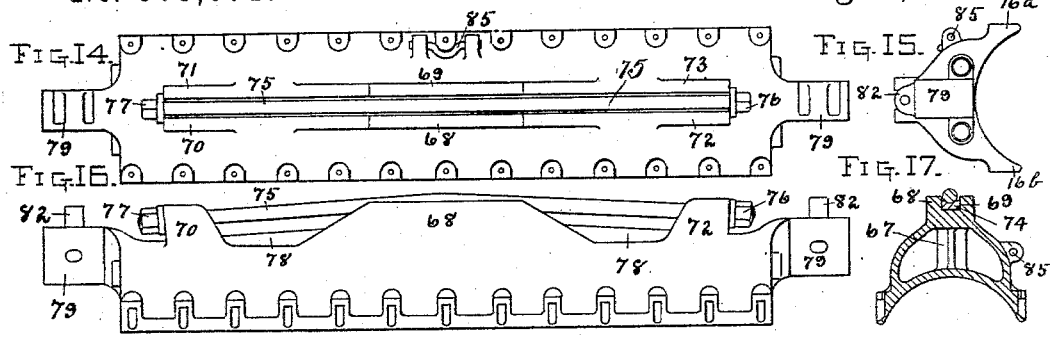
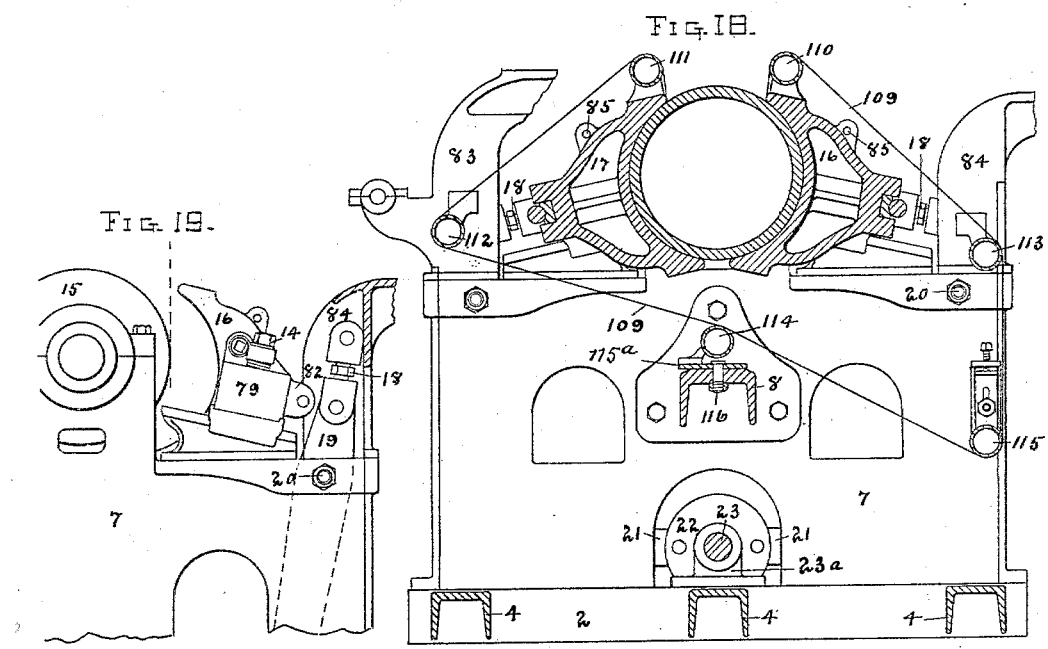
Witnesses:
Fred F. Kemper
W. H. Haynood
Inventor;
David Gessner
By Gifford & Law, Attys (No Model.) 9 Sheets—Sheet 7.
D. GESSNER.
CLOTH PRESSING MACHINE.
No. 565,071. Patented Aug. 4, 1896.
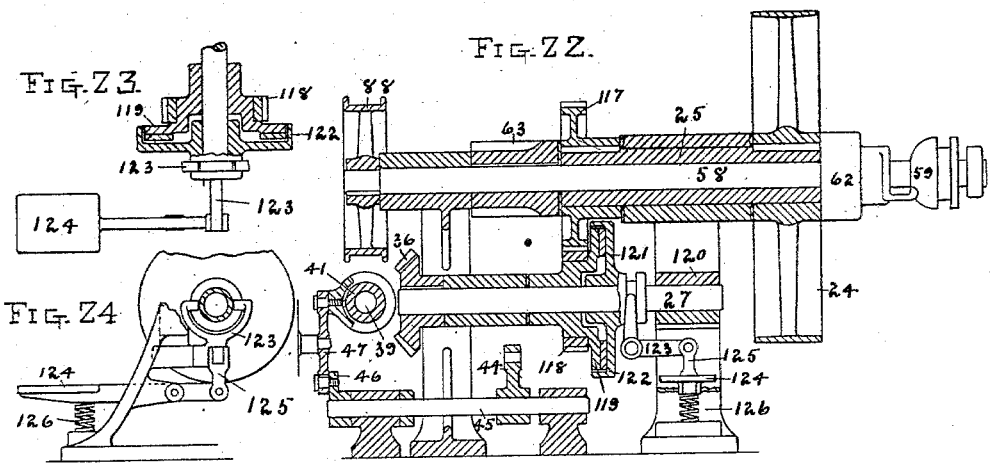
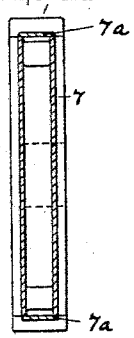
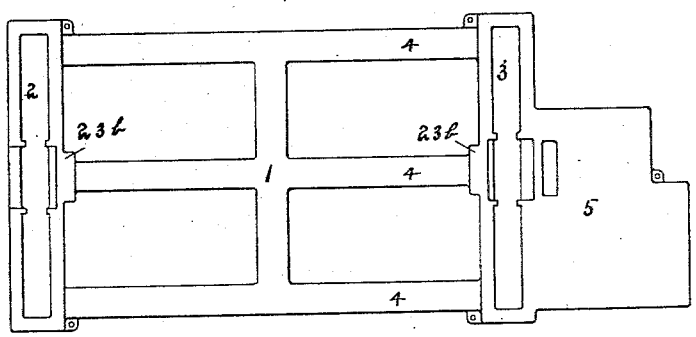
Witnesses:
Inventor:
David Gessner
by Gifford & Daw, Atty's (No Model.) 9 Sheets—Sheet 8.
D. GESSNER.
CLOTH PRESSING MACHINE.
No. 565,071. Patented Aug. 4, 1896.
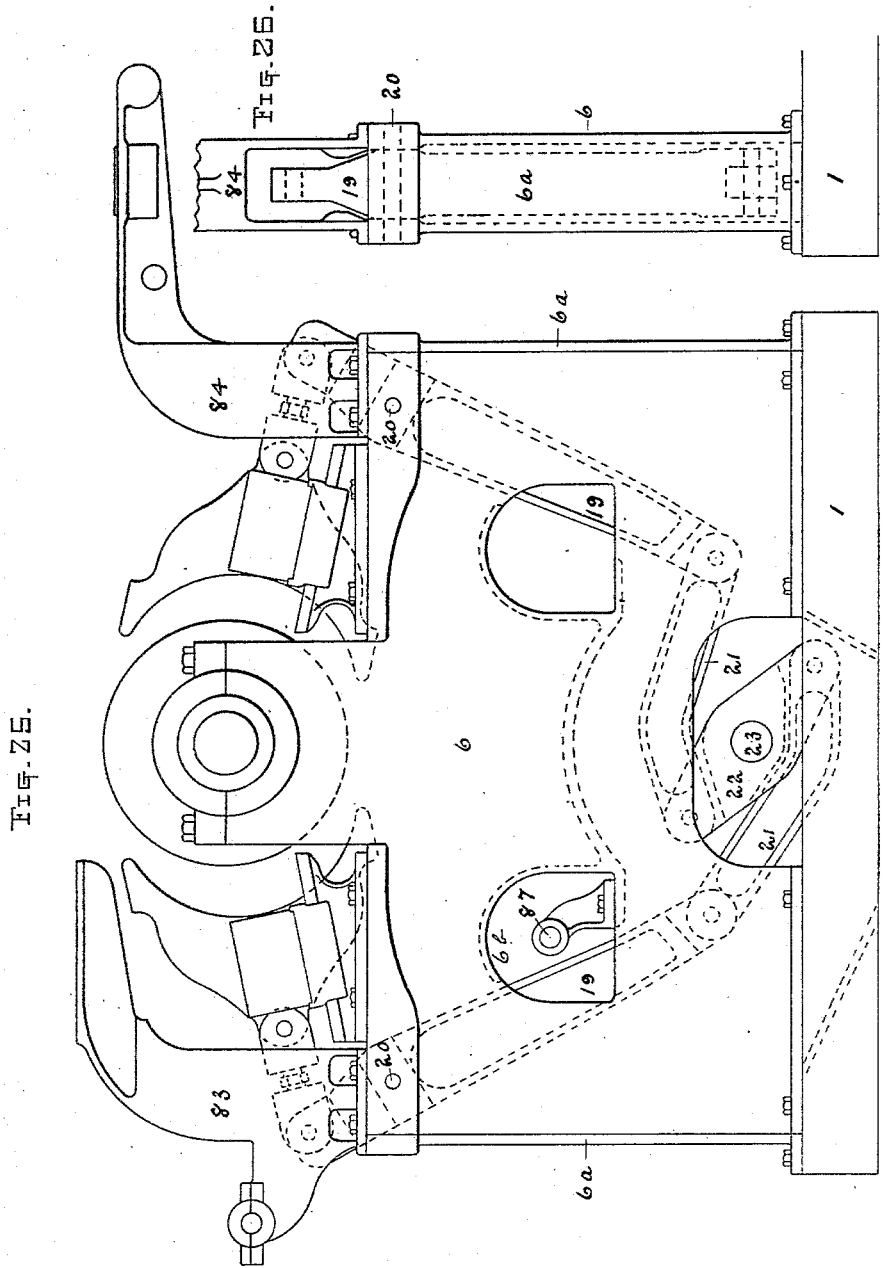
Witnesses:
Fred S. Kemper
D. H. Hayford
Inventor,
David Gessner
by Gifford & Law, Att'ys

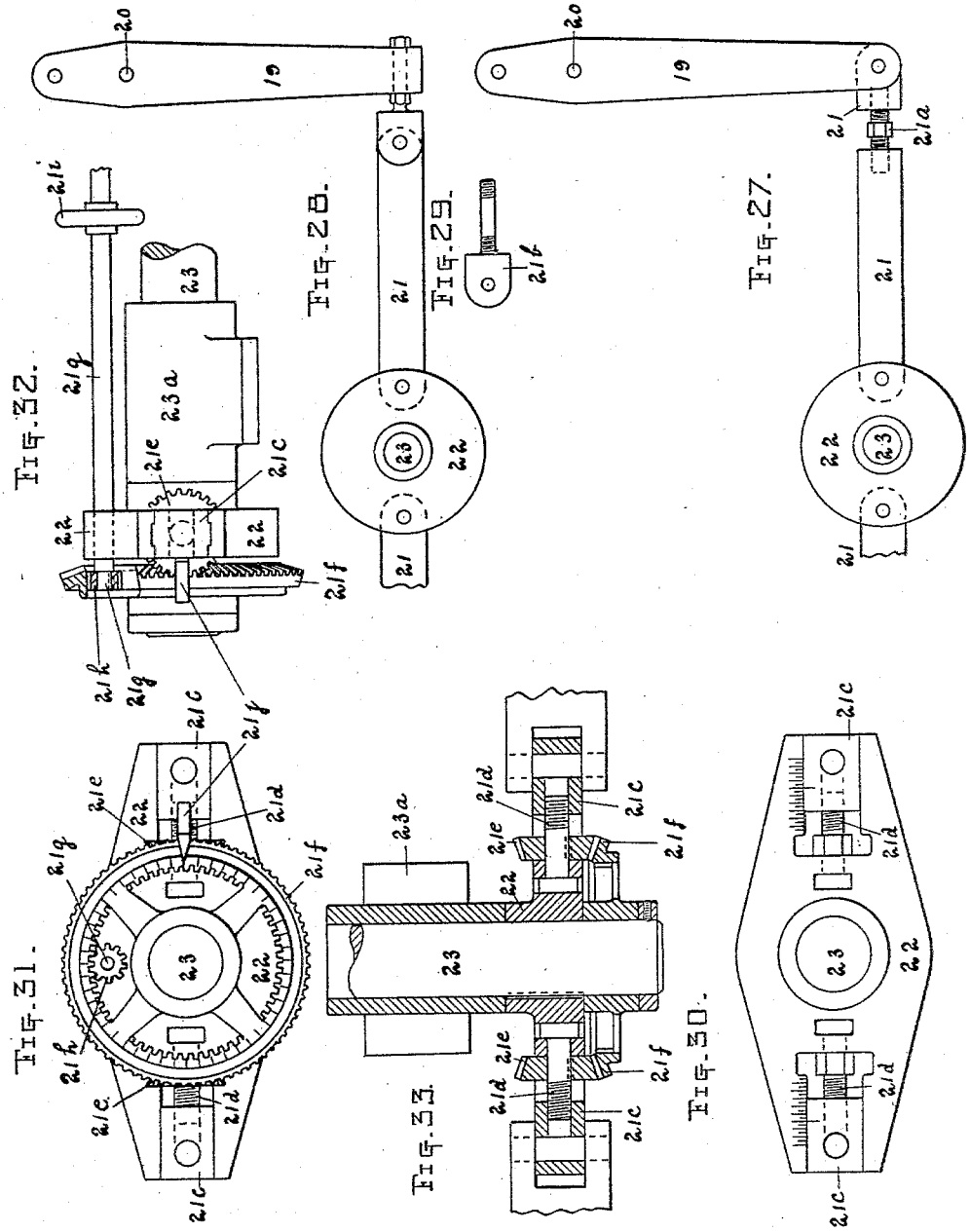

UNITED STATES PATENT OFFICE.

DAVID GESSNER, OF WORCESTER, MASSACHUSETTS.

CLOTH-PRESSING MACHINE.

SPECIFICATION forming part of Letters Patent No. 565,071, dated August 4, 1896.

Application filed October 21, 1893. Serial No. 488,785. (No model.)

*To all whom it may concern:*

Be it known that I, DAVID GESSNER, of Worcester, in the State of Massachusetts, have invented a new and useful Improvement in Cloth-Pressing Machines, of which the following is a specification.

Figure 6:
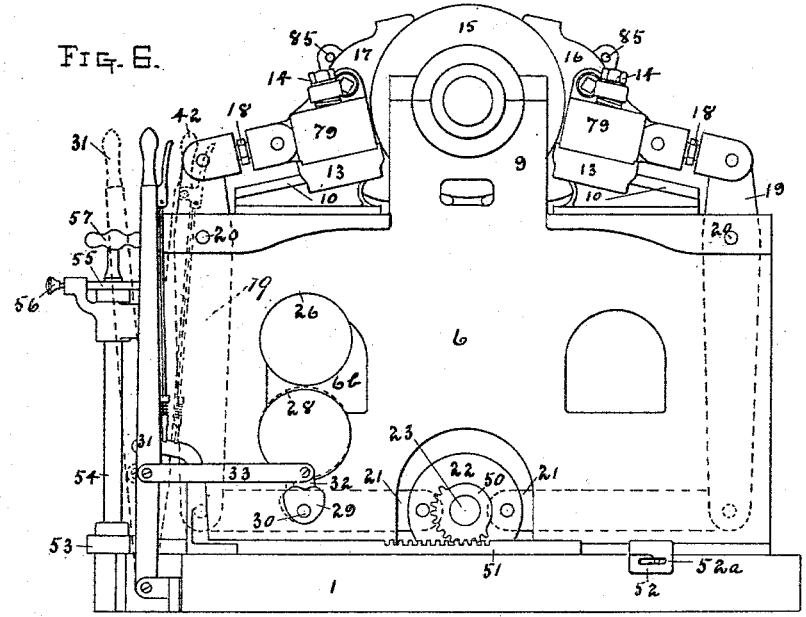
Figure 7:
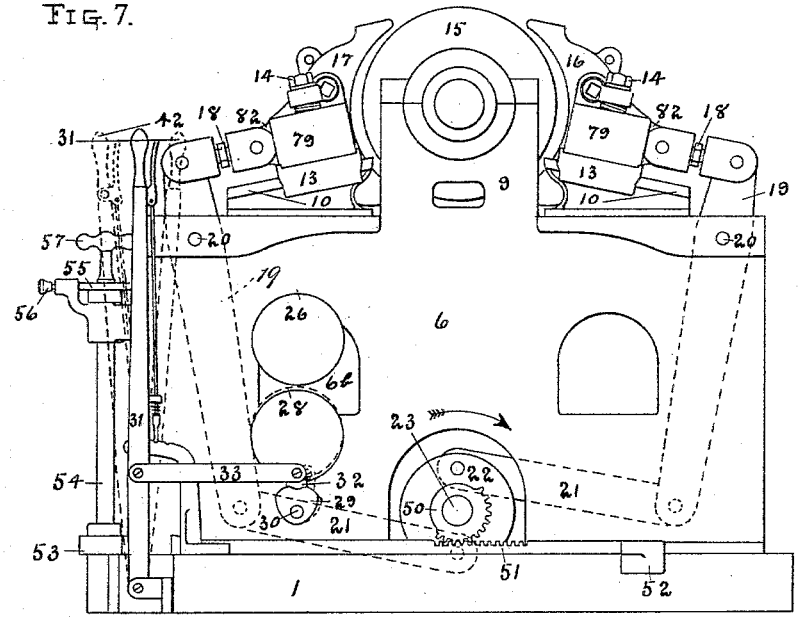

In the accompanying drawings, Figure 1 is an elevation of the right hand end of the machine with the parts in pressing position, at which end the driving-gears are placed. Fig. 2 is a detail of the parts driving the folder and delivery-roller. Fig. 3 is an elevation of the left-hand end of the machine with the parts in pressing position. Fig. 4 is a detail of the bed-plate carriage upon its guideway. Fig. 5 is another detail. Figs. 6 and 7 are end views of the machine, showing the beds in two positions, for pressure and thrown back to release pressure and break contact, with certain of the parts omitted. Fig. 8 is a plan of the right-hand or driving end of the machine. Fig. 9 is a front view of the same. Figs. 10, 11, and 12 are details of the driving mechanism. Fig. 13 is a detail of the adjusting-cam. Figs. 14, 15, 16, and 17 are details of the bed-plate. Fig. 18 shows the arrangement with an endless apron. Fig. 19 is a detail showing the bed-plate disconnected from its operating-lever and in position for removal of the cylinder. Fig. 20 is a plan of the base-plate. Fig. 21 is a horizontal section of one of the end members of the box-frame detached. Figs. 22, 23, and 24 are details of a modification of the friction arrangement for operating the shaft 27. Fig. 25 is an end view of a modified construction permitting of further backward movement without disconnecting the bed-plates from the levers. Fig. 26 is a detail of the box-frame and stand. Figs. 27, 28, 29, 30, 31, 32, and 33 are details of various means of adjustment in the trains of mechanism between the shaft 23 and the bed-plates.

This invention relates to improvements in the class of machines shown in Letters Patent granted to me, No. 424,971 and No. 469,372, in which the cylinder is mounted in stationary bearings upon the frame. Two bed-plates are provided on opposite sides of the cylinder. Each bed-plate is mounted upon carriages which slide on guideways secured to the frame. Mechanism is provided connecting each bed-plate with the frame for moving the bed-plates positively to and from the cylinder, and mechanism is provided for guiding or conducting the cloth to and from the pressing-surfaces.

This invention relates to various parts of the machine, and the forms in which I prefer to construct it may be described as follows:

*Means of supporting cylinder and bed-plates.*—1 is a base-plate which underlies the whole machine and is made of a continuous casting. This base-plate is shown in Fig. 24 to be made of a single casting having parts 2 and 3, upon which the end boxed members 6 and 7 of the upright frame are mounted. The base-plate also contains the girders 4, cast with the parts 2 and 3. An extension 5 projects from one end of the base-plate, with which it is cast in one piece, for supporting the stands that hold the driving-gear. Upon this base-plate at 2 and 3 are erected the end members 6 and 7 of the frame, which are connected together by the girder 8, which is secured to the opposite end members of the frame by suitable bolts. The end members of the frame contain central upward projections 9, upon the top of which are the bearings for the cylinder 15. On each side of each of these upward projections is mounted a guideway to receive a carriage 13 at one end of a bed-plate. 16 and 17 are the bed-plates. These guideways are numbered 10 in the drawings, and a description, referring to Figs. 3 and 4, of one of them and its connections with the bed-plates and frame will answer for all. The guideways are cast in one piece with the web 11 and the flanges 12, which are bolted to the top of the frame, the guideways being preferably inclined at an angle with the flanges 12, so that, as shown in Fig. 3, the guideways will be inclined downwardly away from the cylinder.

13 is a member fitting over the guideways, which forms the carriage for the end of the bed-plate, to which it is bolted by the bolt 14. A more detailed description of the bed-plate will be given hereinafter.

Each of the end members of the frame 6 and 7 is hollowed or boxed, as shown in Fig. 25, sufficiently to receive the actuating-levers and their bottom connection, and each is provided with a removable panel $6^a 7^a$, Figs. 1, 3, 21, and 25, both front and back, permitting the insertion or removal of the levers. In Figs. 6, 7, and 9 the panel is shown as removed. The end member 6 of the boxed frame is provided with an opening $6^b$ for the insertion of the brush and through which the brush-shaft 87 extends to the outside pulley 91, so that the frame member 6 has an opening in one direction for the levers and an opening in a transverse direction for the brush-shaft. This construction, whereby the operating-levers are inclosed within boxed end members of the frame, possesses advantages of great importance. It greatly increases the strength and rigidity of the whole structure. It incloses the levers. It enables the other operative parts of the machine to be disposed to best advantage, either inside or outside the end members of the frame, without conflict in any way with the movement of the levers. Thus, if the end members of the frame were not boxed the following parts, located as shown, would obstruct the path of the levers if placed outside, viz: the belts $88^a$ and $90^a$, sprocket-chain 94, shaft 39, and other parts shown in Fig. 11, shaft 45, and other parts shown or not shown in the drawings. If placed between the end frames, the vibration of the levers would be obstructed by the following parts, viz: rolls for guiding the cloth, and steamer, (shown in dotted lines, Fig. 3,) the endless apron, and some of its roller-supports, whereas in my machine the levers may be freely vibrated or removed front and rear, while any part may be mounted in any desired position on the end frames without crossing the path of the levers.

It is now evident that the cylinder is in stationary bearings and the two bed-plates are mounted upon guideways secured to the frame and that the bed-plates may be slid to and from the cylinder to any distance desirable, which is limited by the length that the constructor makes the guideways. It remains to describe the mechanism by which this movement of the bed-plates is accomplished.

*Mechanism for actuating bed-plates.*—To the rear of each bed-plate at each end is shackled a connection-rod 18, which at the opposite end is shackled to the top or short arm of the vertical lever 19. This connection-rod 18 is screw-threaded, right and left, to the shackles $18^a 18^b$, so that its available length may be adjusted. Each of the levers 19 is fulcrumed at 20, near the top of the frame, and extends down into the interior of the boxed end member of the frame to near the base-plate, at which point there is pivoted to it a horizontal link 21, also located in the interior of the frame, which link has pivoted at its opposite end a double head 22, fixed upon a horizontal shaft 23. The boxed-end member, which is connected with the base-plate, therefore provides a form of support for both ends of the pin or fulcrum 20, one support on each side of the lever 19, and on top of such supports are mounted the bed-plate bearings. The two links 21, at the same end of the machine, are pivoted to the same head 22 on opposite sides of the shaft 23, and the same arrangement is duplicated at the opposite ends of the machine. The heads 22 at both ends of the machine are fixed upon the same shaft 23. The shaft 23 is journaled in stands $23^a$, fixed upon the base-plate at the points $23^b$. (See Figs. 9, 18, and 20.)

Referring now to Figs. 6 and 7, it will be observed that as the shaft 23 is rotated in the direction of the arrow, Fig. 7, the bed-plates will be advanced toward the cylinder until the position of Fig. 6 is reached, when the pressure will be applied to the cloth. When, however, the shaft 23 is turned in the opposite direction, the pressure will be released and the contact broken at the pressing-surfaces and the beds returned to the position shown in Fig. 7.

It remains to describe the means by which the shaft 23 is oscillated in either direction at will, and preferably independently of whether the cylinder be in operation or at rest. For this purpose I preferably communicate the motion from the prime mover to the cylinder by a separate train of mechanism from that by which I communicate the motion from the prime mover to the shaft 23.

The pulley 24, Figs. 1, 9, and 12, is a prime mover which is fixed to a sleeve 25, to which is also fixed the friction-wheel 26. 27 is a shaft upon which is fixed a friction-wheel 28, in position to be engaged with or disengaged from the friction-wheel 26 by the vertical movement of the shaft 27. To accomplish this vertical movement, I provide a heart-cam 29, fixed upon a rock-shaft 30, that may be oscillated by the hand-lever 31, to which it is connected by the arm 32 and the link 33. The bearing 34 of the shaft 27 is supported upon the top of the heart-cam 29 by the adjustable screw 35, which is screwed into the bottom of the bearing and may be adjusted as the contact between the friction-wheels 26 and 28 may require. Upon the opposite end of the shaft 27 (see Fig. 11) is fixed a miter-gear 36, with which engage gears 37 and 38, having their bearings on the cross-shaft 39 and in the forked arm 40, which in turn forms a bearing for the shaft 27. Upon the shaft 39, and between the miter-gears 37 and 38, which revolve loosely thereon, is splined a friction-clutch 41, adapted to engage with either 37 or 38, and thus transmit motion to the shaft 39 from 37, when it will be in one direction, or from 38, when it will be in an opposite direction. The end lever 42, Figs. 8, 9, and 12, moves the clutch 41 into engagement with either miter-gear, as may be desired, through the connecting part or link 43, arm 44, rock-shaft 45, arm 46, and lever 47. On the shaft 39, Figs. 10 and 11, is fixed a worm 48, which engages with the worm-gear 49, fixed on the shaft 23.

Now it will be observed that by shifting the lever 31 so as to engage the frictional wheels 26 and 28, the shaft 27 will be caused to revolve continuously in one direction. The motion of the shaft 27 will be transmitted so as to revolve the shaft 23 in the direction of the arrow, Fig. 7. By shifting the lever 42 in the opposite direction the motion of the shaft 27 will be transmitted so as to revolve the shaft 23 in the opposite direction. Whenever the resistance to the movement of the shaft 23 is greater than the friction between the wheels 26 and 28, the latter will slip and the further movement of the shaft 23 will be stopped.

Upon the shaft 23 is fixed a segment-gear 50, engaging with a rack 51, which slides in guideways upon the base-plate. At one end of it, namely, the end that advances as the pressure of the bed-plates is released, it abuts against a stationary projection 52 on the base-plate, so that the extent of movement of the shaft 23 in releasing the pressure and moving the bed-plates backward is fixed. The abutment 52 may be made adjustable, if desired, by a slot and screw $52^a$. It is desirable that the extent of movement of the shaft 23 in the opposite direction should be adjustable. Therefore, the abutment, to arrest the motion of the rack 51 at the opposite end, consists of the spiral cam 53, fixed to a vertical shaft 54. The surface of this cam 53 consists of a series of steps, as shown in Figs. 1, 9, and 13. Corresponding with these steps are a series of notches in the periphery of a dial 55, fixed to the upper end of the shaft 54. A push-button 56 is arranged to coöperate with the notched dial 55, so that by being pushed into any of the notches the corresponding step of the cam 53 will be presented as an abutment to the end of the rack 51. 57 is a handle by which the shaft 54 may be turned. By this arrangement it will be seen that by setting the shaft 54 in any position shown on the dial the point at which the forward movement of the shaft 23 will be arrested can be fixed as desired. By graduating the cam 53 with suitable fineness the degree of positive pressure given by the bed-plates may be regulated to a nicety.

At whatever position the bed-plates may be brought by the forward motion of their actuating mechanism they will be held by the worm 48, which thus acts as a stop, so that the bed-plates will not recede even when the contact between the friction members is broken, but will remain in pressing position until the worm is turned backward.

I have already mentioned, in the train of mechanism by which the bed-plates are operated, the adjustments at the rods 18, also by the set-screw 35, Figs. 1 and 12, and also by the cam 53. If desired, another adjustment may be made at the double heads 22. Obviously, the distance of each of the bed-plates from the cylinder corresponding with a given position of the shaft 23 at either end will depend upon the position in which the double head 22 at that end of the machine is fixed upon the shaft. By unfastening the head 22 at either end of the machine from the shaft 23 and turning it either forward or backward and fixing it in the turned position, the distance of the bed-plates at that end of the machine from the cylinder may be made greater or less, and by thus adjusting the double head 22 upon the shaft 23 at one end or the other of the machine, the beds may be adjusted parallel with the cylinder.

An adjustment may also be introduced between the lever 19 and the link 21. In Fig. 27 this adjustment is made by dividing the link 21 into two parts, which are connected by a rod $21^a$, screw-threaded right and left, to the two divisions of the link 21. In Fig. 28 this adjustment is made by employing a shackle $21^b$, Fig. 29, which is pivoted to the link 21 and adjustably bolted to the lower end of the lever 19.

An adjustment may also be introduced between each of the links 21 and the head 22, as shown in Fig. 30, where a sliding box $21^c$ is provided to be pivotally connected with the end of link 21. This sliding box is mounted in guideways on the head 22, so as to slide to and from the center of the shaft 23, and its position at any adjustment may be fixed by the set-screw $21^d$, screw-threaded to it and revolubly fixed in the head 22. A graduated scale may be placed on the head 22, adjacent to the sliding box, to record the adjustment.

An adjustment may also be employed by which the four levers instead of being separately adjusted may all be adjusted at once and in unison. Such an arrangement is shown in Figs. 31, 32, and 33, and consists in the following mechanism, by which the set-screws $21^d$ for all four links 21 are moved in unison: Upon each of the set-screws is fixed a bevel-gear $21^e$. Upon the shaft 23, adjacent to each head 22, is revolubly mounted a bevel-gear $21^f$, which couples together the two bevel-gears $21^e$ on that head. Thus whenever either of the bevel-gears $21^f$ is moved it will produce a corresponding adjustment of both set-screws on one of the heads 22.

The two bevel-gears $21^f$, at opposite ends of the machine, are coupled together by a shaft $21^g$, revolubly mounted on the heads 22, and which is geared to each of them by a pinion $21^h$, meshing with teeth internally arranged on the bevel-gear $21^f$. The shaft $21^g$ may be turned by a hand-wheel $21^i$, whereupon, obviously, the corresponding adjustment will be simultaneously made in the mechanisms for operating all of the bed-plates. The extent of the adjustment may be recorded on a graduating-scale on the bevel-gear $21^f$ by a pointer $21^j$.

The parts of the frame are so disposed that the motion of the heads 22 is never so great as to cause the shaft $21^g$ to strike any part.

The importance of the universal adjustment just described is great, by reason of the fact that the ordinary help in a mill cannot be relied upon to properly adjust the bed-plates where that adjustment has to be accomplished at each end of each bed-plate separately.

In the forms already described the backward movement of the beds to the extent shown in Fig. 19 required the unshackling of the rods 18 from the bed-plate, and provision is made, as shown in that figure, in the stand adjacent to each of the rods 18 for throwing that rod and the shackle upward out of the way. When in the form already described these parts were not unshackled, the throw from the heads 22 limited the backward movement of the bed-plates substantially to that shown in Fig. 7. To provide for a further backward movement, I may employ the construction shown in Fig. 25, which may be described as follows: The heads 22 instead of being made circular, as in Fig. 7, are here made oblong and the links 21 are made of the form shown, so that the extent of possible oscillation of the heads 22 is greatly increased, securing a correspondingly-increased movement of the bed-plates away from the cylinder. This movement also entails an increased movement of the levers 19, to accommodate which the box-end members 6 and 7 of the frame are properly modified.

A ready means of adjustment for leveling the bed-blade is provided by moving either of the guideway-castings 10 to or from the central projection 9 of the main frame, whereby the inclined position of the guideway will raise or lower the end of the bed-plate resting on it.

As a modification, in lieu of the friction-wheels 26 and 28 and the arrangements for moving the shaft 27 vertically, I may employ the construction shown in Figs. 22, 23, and 24, of which the following is a description.

117 is a gear-wheel keyed to the sleeve 25, with which engages a gear-wheel 118, running loosely on the shaft 27 and carrying a disk 119. The shaft 27 is mounted in stationary bearings 120, and to it is splined a friction-disk 121 to engage frictionally with the disk 119. The disk 121 may carry a circular flange 122, overlapping the edge of the disk 119, to exclude oil and other substances from the friction-surfaces. The disk 121 is shifted by a bell-crank lever 123, controlled by a foot-lever 124, to which it is connected by the link 125. This foot-lever is held normally upward by the spring 126. Whenever it is desired to start the shaft 27, the foot-lever 124 is pressed downwardly, so as to engage the friction-disks 119 and 121. Upon the release of the foot-lever the spring 126 causes the disengagement of these disks.

*Mechanism for driving the cylinder.*— Through the sleeve 25, which carries the prime moving pulley 24, extends a shaft 58. Upon this shaft is splined one member 59 of a friction-clutch, which member may be shifted by a lever 60, connected with a rod 61, Figs. 3, 8, 9, and 12, extending all the way across the front of the machine, so as to be readily accessible to the hand of the operator wherever he may happen to be. 62 is the other member of the friction-clutch, which is fixed so as to turn with the prime mover 24. Upon the shaft 58 is fixed a pinion 63, that gears into the gear-wheel 64. The gear-wheel 64 is fixed upon a sleeve 65, that carries the pinion 65ª, Fig. 10, which drives the gear-wheel 66, fixed upon the gudgeon of the cylinder.

By the train of mechanism just described it will be observed that the starting and stopping of the cylinder can be accomplished at any position of the bed-plates and the bed-plates can be operated by power whether the cylinder is in motion or not.

*Construction of bed-plates.*—In Figs. 14 to 17 I have shown in detail the construction of bed-plate that I prefer to employ. The working face is adapted to be covered with sheet metal, as described in my Patent No. 469,372. The bed-plate is cored to form a steam-chamber, as shown, having its chest traversed from front to rear by stays 67 at suitable intervals. At the rear of this series of internal stays project rearwardly the flanges 68 and 69 of the form shown. In line with these flanges, at opposite ends of the bed-plate, are the lugs 70, 71, 72, and 73. Between the flanges 68 and 69 is fitted a sliding block 74, which is adapted to slide longitudinally between the flanges. Over this sliding block is drawn the truss-rod 75, the ends of which project beyond the lugs 70, 71, 72, and 73, and are provided with suitable nuts 76 and 77 for producing the requisite degree of tension. This truss-rod, as shown, is raised by the block 74 at its center and depressed at its ends, and the faces of the lugs against which its nuts abut are faced off, so as to be about at right angles with the direction of the rod.

By the arrangement just described the block 74 will come and go as the tension is regulated by the nuts 76 and 77, so that the operator can regulate the tension from either end of the bed-plate without being obliged to disturb the cloth to get access at the middle, as heretofore. I also prefer to provide a tin or rib 78, extending underneath the tension-rod 75, between the flanges.

At each extremity the bed-plate is provided with a projection 79, which is perforated vertically, as shown in Fig. 16, to receive the bolt 14, Fig. 4. If desired, beneath the head of this bolt may be placed a cap 80, and under this a spring 81, Fig. 5, to permit of some freedom of movement on the carriage, enabling it to tip to the slightest extent. From the rear of the projection 79 extends a lug 82, to which is shackled the rod 18, by which the bed-plate is connected with the vertical operating-lever.

It will be observed that the rearward faces of the ears 68, 69, 70, 71, 72, and 73 and of the lugs 82 are all in the same plane, substantially. This is of importance, because it affords support for the bed-plates at all those points as the same are being planed and enables the construction of a more perfectly true bed-plate. It will also be observed that these surfaces are at right angles with the exterior of the surfaces 16ª 16ᵇ at the horns of the bed-plate and with the upper and lower surfaces of the projection 79, so that substantially all of the planed surfaces of the bed-plate excepting the circle are either parallel or at right angles with each other, affording great advantages in construction, both as regards convenience and perfection of work and affording facility for leveling the bed-plates.

85 is a handle swinging in lugs cast to the bed. This handle is in such position that when the bed is lifted by it the center of gravity of the bed will cause it to swing in proper position to be readily placed upon its bearings in the machine. This handle becomes particularly useful in cases where an endless apron is employed in the machine, as shown in Fig. 18, because in such cases the removal or insertion of an apron requires the movement of the bed-plates.

The two rolls 110 and 111 by which the endless apron is carried are shown in Fig. 18 as mounted one on each bed-plate, so that the retreat of the bed-plates will carry them backward and cause the apron to slack and thereby break the contact around the cylinder and prevent the cloth from receiving press-marks by being held by the apron in contact with the cylinder.

*Means of driving brushes.*—86 and 87, Figs. 1, 3, 8, and 9, are the brush-shafts. Upon the shaft 58 is fixed a pulley 88. Upon the shaft 86 are fixed pulleys 89 and 90. Upon the shaft 87 is fixed a pulley 91. The pulleys 88 and 89 are connected by a belt 88ª and the pulleys 90 and 91 by another belt 90ª. By arranging these belts either straight or cross the direction in which the brush-shafts revolve may be controlled.

*Means for folding the cloth.*—Upon the sleeve 65 is mounted a sprocket-wheel 93, which drives the sprocket-chain 94, which in turn drives the sprocket-wheel 95, Figs. 1, 2, 8, and 10, which is on the shaft 96 of the delivery-roll 97, which may be employed either for rolling up the cloth or delivering it to the folder, as may be preferred.

98 is the folder, which is driven by a pin 99 in the face of the gear-wheel 100, which is driven by a gear-wheel 101, splined to the shaft 96, so as to be slid out or in engagement with the gear-wheel 100, as may be desired. When in the position shown in Fig. 2, the folder will be operated, but if it be desired to operate the delivery-roll without the folder it may be slid upon the shaft, so as to be disengaged from the gear-wheel 100.

I sometimes employ an endless apron 109, Fig. 18, which extends partly around the cylinder and may be supported by the parallel carrier-rollers 110, 111, 112, 113, 114, and 115, of which one, as 115, may be made adjustable up and down to take up the slack of the endless apron, and another one, as 114, may be made swiveled, so that it is self-adjusting to make the apron run true.

One or more of the rolls, as 110 and 111, are mounted on the bed-plates, so that the retreat of the bed-plates will carry them backward and cause the apron to slack, thereby breaking the contact around the cylinder and preventing the cloth from receiving press-marks by being held by the apron in contact with the cylinder.

To insert or remove an endless apron from a cloth-pressing machine has heretofore been so difficult an operation, in consequence of the construction of the machine, as to almost preclude its use. By constructing the machine as above described, however, the difficulty is obviated. To place the apron in the machine, it is necessary to unshackle the bed-plates from the rods 18 by pulling out the shackle-pin and to remove the bolts 14. Then, by a tackle fastened to the handle 85, lift the beds one at a time until the apron can be slipped over the ends. Then let it down into its former position, and after this has been done with both beds replace the bolts 14 and shackle-pins. As soon as the tackle is detached from the handle of the bed-plate of course the apron can be straightened out, so as to cover the whole length of the bed-plate.

To facilitate the above operations, the stands 83 and 84 will preferably be removed, being detachable from the main frame. The rolls 110, 111, 112, 113, and 115 are removable, so that they can be inserted after the apron has been put in place with respect to the beds.

The simplicity of the above operation will be made apparent when it is remembered that the handles of the bed-plates are, as already explained, so placed as that when the bed-plate is lifted its position is not otherwise substantially changed, and that the removal of the shackle-pins and their replacement does not necessarily affect the adjustment of the pressing-surfaces, so that, after the apron has been removed and a new one inserted, the adjustment of the pressing-surfaces will be found exactly as it was before.

I have shown my invention applied to a machine containing two bed-plates and to each of which the motion of the shaft 23 is transmitted by the links 18 and 21 and the lever 19, but I do not wish to be understood as limiting myself to the employment of these parts or to a machine containing two bed-plates.

The members by which the pressure is exerted against the cylinder I have termed "bed-plates," but I wish to be understood as using this term in a broad sense indiscriminately with press-plates to include members of any construction whereby the cloth is pressed against the cylinder.

The term "pressing member" as used herein I define as broadly a member of any form or construction containing a cloth-finishing surface, which member is adapted to move to and from another cloth-finishing surface, between which and its own surface the cloth is pressed. The form of pressing member shown in the accompanying drawings is the bed-plate 16 or 17.

I claim—

1. In a cloth-pressing machine in combination, a cylinder, a pressing member, an upright boxed frame member carrying supports for one end of the cylinder and pressing member, operating mechanism for said end of the pressing member extending within said boxed frame member, means for supporting the other end of the cylinder and pressing member and means for operating the said other end of the pressing member, substantially as described.

2. In a cloth-pressing machine in combination a cylinder, a pressing member, a brush-shaft, an upright boxed frame member carrying supports for one end of the cylinder and of the pressing member and of the brush-shaft and provided with an opening through which said brush-shaft extends, operating mechanism for one end of the pressing member extending within the boxed frame member, means for supporting the other end of the cylinder and pressing member and means for operating the said other end of the pressing member, substantially as described.

3. In a cloth-pressing machine in combination, a cylinder, a pressing member, an upright boxed frame member, supports for one end of the cylinder and pressing members located outside of said boxed member, the lever 19 extending within said boxed member, connection between said lever and pressing member, means for operating said lever, means for supporting the other end of the cylinder and means for supporting and operating the other end of said pressing member, substantially as described.

4. In a cloth-pressing machine in combination, a cylinder, a pressing member, a base-plate, two upright boxed frame members mounted upon said base-plate, supports for the cylinder and pressing member located outside of said boxed members, a shaft 23 and means extending interiorly through said boxed members whereby the movement of said shaft is communicated to said pressing member, substantially as described.

5. In a cloth-pressing machine, in combination, the cylinder, the pressing member, mechanism for operating the pressing member, the gearing by which said cylinder and operating mechanism are driven, a frame consisting of the upright end members whereon are supported the cylinder and pressing member and a base-plate containing the connected parts 2 and 3 for the support of said upright members and the extension 5 outside of said upright members for the support of said gearing, substantially as described.

6. In a cloth-pressing machine in combination, a cylinder, a pressing member, upright frame members supporting the cylinder, carriages for the pressing member, inclined guideways 10 interposed between the carriages and said upright members, means for securing said guideways to said upright members and permitting said guideways to be adjusted to and from the cylinder to control the elevation of the pressing member, substantially as described.

7. In a cloth-pressing machine, in combination, a cylinder, two pressing members one on each side thereof, the upright levers 19, connections between the same and the pressing members, the links 21, the shaft 23 and the head 22 fast to said shaft and pivoted on opposite sides of the center to both of said links 21, substantially as described.

8. In a cloth-pressing machine, in combination, a cylinder, a pressing member, a prime mover, a train of mechanism interposed between said prime mover and cylinder and an independently-operative train of mechanism interposed between said prime mover and said pressing member whereby the power of said prime mover may be communicated to the cylinder or to the pressing member independently, substantially as described.

9. In a cloth-pressing machine, in combination, a cylinder, a pressing member, a prime mover and mechanism containing a friction-clutch interposed between said prime mover and said pressing member whereby the continued motion of said prime mover will produce the desired movement of the pressing member and the slipping of the friction-clutch will permit the pressing member to stop in the desired position, substantially as described.

10. In a cloth-pressing machine in combination, a cylinder, a pressing member, a prime mover, mechanism containing a friction-clutch interposed between said prime mover and said pressing member whereby the continued motion of said prime mover will produce the desired movement of the pressing member and the slipping of the friction-clutch will permit the pressing member to stop in the desired position and an adjustable stop whereby the pressing position of said pressing member may be regulated, substantially as described.

11. In a cloth-pressing machine, in combination, a cylinder, a pressing member, a prime mover, mechanism containing a friction-clutch interposed between said prime mover and said pressing member whereby the continued motion of said prime mover will produce the desired movement of the pressing member and the slipping of the friction-clutch will permit the pressing member to stop in the desired position and a stop whereby the backward movement of said pressing member may be arrested, substantially as described.

12. In a cloth-pressing machine, in combination, a cylinder, two pressing members, a shaft 23, means for actuating the same, heads 22 fixed upon said shaft, mechanism for communicating the motion of said heads to the pressing members and adjusting mechanism interposed between said heads and said means for actuating said shaft 23 whereby the available throw communicated by said heads to all of said pressing-member-operating mechanisms may be simultaneously controlled, substantially as described.

13. In combination, the bed-plate of a cloth-pressing machine and a truss-rod; the said bed-plate being provided with longitudinal flanges, 68 and 69 extending rearwardly on each side of the truss-rod, also with a support 74 arranged between said flanges and between the middle of said truss-rod and the back of the bed-plate, substantially as described.

14. In combination, the bed-plate of a cloth-pressing machine and a truss-rod; the said bed-plate being provided with longitudinal flanges, 68 and 69 extending rearwardly on each side of the truss-rod, also with a support 74 arranged between said flanges and between the middle of said truss-rod and the back of the bed-plate, also with an internal stay, 67, extending from front to rear of the bed-plate, substantially as described.

15. A cloth-pressing-machine bed-plate consisting of a shell provided with a concave pressing-surface on the front, a reinforcing longitudinal fin, 78, projecting at the back and an internal stay, 67, extending across the space within said shell between said fin and said concave pressing-surface, substantially as described.

16. A cloth-pressing-machine bed-plate having a rear surface extending in one plane substantially to the middle and to both ends, the plane of which surface is substantially parallel with the axis of the curved face.

17. In a cloth-pressing machine, in combination, the shaft 96, means for driving the same, the delivery-roller 97 mounted thereon, the folder 98, the gear 100 by which the folder is vibrated and the gear 101 splined to the shaft 96 in such position as to be movable into or out of engagement with gear 100 by the movement of which the operation of the folder may be arrested while the delivery proceeds, substantially as described.

18. In a cloth-pressing machine in combination, the cylinder, a bed-plate, an endless apron and an apron-distending roll 110 mounted upon the bed-plate whereby the retreat of the bed-plate carries with it the said apron-distending roll and slacks the apron, substantially as described.

19. In a cloth-pressing machine, in combination, a cylinder, a pressing member, a prime mover, mechanism containing a friction-clutch and a locking device interposed between said prime mover and said pressing member whereby the continued motion of said prime mover will produce the desired movement of the pressing member and the slipping of the friction-clutch will permit the pressing member to stop in the desired position and the locking device will hold the same in said position when the friction-clutch is released, substantially as described.

20. In a cloth-pressing machine, in combination, the cylinder, a bed-plate, a frame consisting of the upright end members whereon are supported the cylinder and bed-plate, a base-plate containing the connected parts 2 and 3 for the support of said upright members and the extension 5 outside of said upright members, a shaft 23 extending between said upright frame members and through and beyond one of them, bearings for said shaft connected with said base-plate parts 2 and 3, the gear 49 upon the end of said shaft 23 which projects beyond said upright frame member, the gear 66 upon the cylinder-shaft outside of said upright frame member and mechanism mounted upon the base-plate extension 5 whereby said gears 49 and 66 are driven, substantially as described.

21. In combination, the cylinder, the two bed-plates one on each side thereof, the levers 19, the base-plate, a support on each side of each lever connected with the base-plate, a pin 20 forming the fulcrum for each lever and having a bearing at each end on said supports, a bed-plate bearing on top of each pair of said supports, a shaft 23, connections between said shaft; each of said levers extending between said supports and mechanism for driving said shaft, substantially as described.

22. In combination, the cylinder, two bed-plates one on each side thereof, the levers 19, the base-plate, the upright end frames carrying the bearings of cylinder and bed-plates, the shaft 23 extending between and projecting outside of said frames, connection beween said shaft and said levers, the base-plate extension 5 and means mounted on said base-plate extension whereby said shaft 23 is driven, substantially as described.

23. In a cloth-pressing machine, in combination with the cylinder and a pressing member, the following mechanism for operating said pressing member, viz: a shaft, 39, carrying a worm, 48, and the bevel-gears 37 and 38, connections between said worm and the pressing member, a clutch, 41, loose on said shaft between said bevel-gears and means for operating said clutch, substantially as described.

24. In a cloth-pressing machine, in combination with the cylinder and a pressing member, the following mechanism for operating the same, viz: a prime mover, a cylinder-starting lever, 60, connections controlled by said lever whereby the power of said prime mover is transmitted to the cylinder, a pressing-member-starting lever, a pressing-member-reversing lever, 42, connections controlled by said two last-named levers whereby the power of said prime mover is transmitted to said pressing member, to operate the pressing member in either direction independently of the position of said cylinder-starting lever 60, substantially as described.

25. In a cloth-pressing machine, in combination with the cylinder and a pressing member, the following mechanism for operating the same, viz: a prime mover, a shaft, 58, a friction connection between said shaft and prime mover, means for making and breaking the same, connections between said shaft and the cylinder, a shaft, 27, a friction connection between said shaft and prime mover, means for making and breaking the same, and connections between said last-named shaft and the pressing member, substantially as described.

26. In a cloth-pressing machine, in combination with the cylinder and a pressing member, the following mechanism for operating the same, viz: two shafts, 58 and 27, a separate friction mechanism whereby each is driven, means for connecting and disconnecting the parts of said friction mechanisms, connections between one of said shafts and the cylinder and connections containing reversing mechanism between the other of said shafts and the pressing member and means for operating said reversing mechanism, substantially as described.

27. In a cloth-pressing machine, in combination, with the cylinder and a pressing member, the following mechanism for operating the same, viz: a shaft, 58, connections between said shaft and the cylinder, a pulley, 24, running loose on said shaft, a gear, 117, fast to said pulley, a shaft, 27, connections between the same and said gear, a shaft, 39, reversing mechanism connecting said shaft 27 with said shaft 39 and means whereby said shaft 39 is connected with said pressing member, substantially as described.

28. In a cloth-pressing machine containing a cylinder and a pressing member, the following mechanism for operating said pressing member, viz: a shaft, 27, means whereby the same is driven in one direction, a shaft, 39, connections between the same and the pressing member, and a reversing mechanism connecting said shafts, substantially as described.

29. In a cloth-pressing machine containing a cylinder and a pressing member coöperating therewith, in combination with said parts, the following mechanism for operating said pressing member, viz: a shaft 27, mechanism for stopping and starting said shaft, a shaft, 39, reversing mechanism interposed between said two shafts and connections between said shaft 39 and said pressing member, substantially as described.

30. In a cloth-pressing machine, in combination with a cylinder and a pressing member, the following mechanism for operating said pressing member, viz: an oscillating shaft, 23, a connection between said shaft and said pressing member, a worm-wheel, 49, whereby said shaft is driven, a worm-shaft, 39, a shaft, 27, extending from said worm-shaft to near the prime mover, the prime mover and connections between the prime mover and said shaft 27, substantially as described.

31. In a cloth-press containing a cylinder and a pressing member, in combination, a shaft, 23, a connection between the same and said pressing member, a shaft, 39, a connection between said shafts 39 and 23, a shaft, 27, a connection between said shafts 27 and 39, a prime mover, connections between said prime mover and said shaft 27, and a reversing mechanism interposed in said chain of mechanism, substantially as described.

32. In a cloth-pressing machine, in combination, the cylinder, the shaft 58 connected therewith for operating the same, a pulley running loosely upon said shaft, a pressing member and mechanism connecting said pressing member with said pulley whereby by the operation of said pulley said pressing member may be operated while said shaft remains stationary, substantially as described.

DAVID GESSNER.

Witnesses:
ALBERT A. BARKER,
W. HENRY RAMSDELL.